United States Patent
Freiderich et al.

(10) Patent No.: US 11,579,115 B2
(45) Date of Patent: Feb. 14, 2023

(54) ASSEMBLY AND METHOD FOR INTERCHANGEABLY HOLDING AN ELECTROCHEMICAL SUBSTRATE

(71) Applicant: Consolidated Nuclear Security, LLC, Oak Ridge, TN (US)

(72) Inventors: John W. Freiderich, Oak Ridge, TN (US); Tasha L. Boyd, Clinton, TN (US); Benjamin D. Green, Knoxville, TN (US)

(73) Assignee: Consolidated Nuclear Security, LLC, Oak Ridge, TN (US)

(*) Notice: Subject to any disclaimer, the term of this patent is extended or adjusted under 35 U.S.C. 154(b) by 0 days.

(21) Appl. No.: 16/421,550

(22) Filed: May 24, 2019

(65) Prior Publication Data
US 2020/0371061 A1    Nov. 26, 2020

(51) Int. Cl.
*G01N 27/416*    (2006.01)
*G01N 27/28*    (2006.01)

(52) U.S. Cl.
CPC .......... *G01N 27/416* (2013.01); *G01N 27/28* (2013.01)

(58) Field of Classification Search
CPC ...... G01N 27/226; G01N 27/27; G01N 27/28; G01N 27/283; G01N 27/403;
(Continued)

(56) References Cited

U.S. PATENT DOCUMENTS 1,524,937 A * 2/1925 Keeler .................. G01N 27/07
                                                    324/443
3,129,850 A * 4/1964 Kaiser ................ G03G 15/0803
                                                    222/67
(Continued)

FOREIGN PATENT DOCUMENTS

CN     102590299 A  *  7/2012
DE   202016104543 U1 * 12/2017
(Continued)

OTHER PUBLICATIONS

Shao, Z., Haile, S., Ahn, J. et al. A thermally self-sustained micro solid-oxide fuel-cell stack with high power density. Nature 435, 795-798 (2005). (Year: 2005).*

*Primary Examiner* — Alexander W Keeling
*Assistant Examiner* — Mofoluwaso S Jebutu
(74) *Attorney, Agent, or Firm* — Clements Bernard Walker; Christopher L. Bernard; Christine Wilkes Beninati (57) ABSTRACT

An electrochemical substrate holder assembly, including: a first housing and a second housing; wherein the first housing and the second housing collectively define an interior space; a first gasket coupled to the first housing and adapted to contact a first side of a substrate; and a second gasket coupled to the second housing and adapted to contact a second side of the substrate; wherein the first gasket and the second gasket are collectively adapted to hold the substrate within the interior space. The first housing defines a first port adapted to receive a first electrical lead to electrically contact the first side of the substrate. The second housing defines a second port adapted to allow a fluid to pass there through to fluidly contact at least the second side of the substrate. The second housing is adapted to receive one or more of a second and third electrical lead.

14 Claims, 4 Drawing Sheets

(58) Field of Classification Search
CPC .. G01N 27/413; G01N 27/453; G01N 27/416; H01M 2/02; H01M 2/025
See application file for complete search history.

(56) References Cited

U.S. PATENT DOCUMENTS

| | | | | |
|---|---|---|---|---|
| 4,689,122 A * | 8/1987 | Polak | ................ | G01N 27/4074 204/421 |
| 4,915,803 A * | 4/1990 | Morris | ................ | C25B 9/73 205/513 |
| 5,141,617 A * | 8/1992 | Nagy | ................ | G01N 27/416 204/252 |
| 5,324,410 A * | 6/1994 | Kummer | ................ | H01L 21/68735 204/297.05 |
| 6,726,823 B1 * | 4/2004 | Wang | ................ | B23H 5/08 204/224 M |
| 7,022,290 B2 * | 4/2006 | Gural | ................ | H01M 10/4285 378/51 |
| 7,832,737 B2 * | 11/2010 | Chou | ................ | F16J 15/102 277/652 |
| 9,022,652 B2 * | 5/2015 | Chupas | ................ | H01M 10/48 378/208 |
| 10,236,477 B2 * | 3/2019 | Venkateswaran | ................ | H01G 11/72 |
| 2003/0203267 A1 * | 10/2003 | Chou | ................ | F16J 15/122 29/623.2 |
| 2009/0084183 A1 * | 4/2009 | Baan | ................ | G01N 29/28 73/618 |
| 2010/0320087 A1 * | 12/2010 | Coster | ................ | G01N 27/416 204/412 |
| 2014/0102916 A1 * | 4/2014 | Louw | ................ | G01N 27/49 205/780.5 |
| 2014/0262770 A1 * | 9/2014 | Kramer | ................ | G01N 27/403 204/400 |
| 2014/0270080 A1 * | 9/2014 | El-Dasher | ................ | G01N 23/201 378/86 |

FOREIGN PATENT DOCUMENTS

| | | |
|---|---|---|
| JP | 2007227072 A | 9/2007 |
| KR | 20150047796 A | 5/2015 |
| RU | 2425181 C1 | 5/2011 |
| RU | 2650825 C1 | 4/2018 |
| RU | 2654317 C1 | 5/2018 |
| WO | 9622523 A1 | 7/1996 |

* cited by examiner

ASSEMBLY AND METHOD FOR INTERCHANGEABLY HOLDING AN ELECTROCHEMICAL SUBSTRATE

STATEMENT REGARDING GOVERNMENT RIGHTS

The U.S. Government has certain rights to the present disclosure pursuant to Contract No. DE-NA0001942 between the U.S. Department of Energy and Consolidated Nuclear Security, LLC.

TECHNICAL FIELD

The present disclosure relates generally to the electrochemistry field. More particularly, the present disclosure relates to an assembly and method for interchangeably holding an electrochemical substrate.

BACKGROUND

The field of electrochemistry encompasses a large body of ongoing research pertaining to sensors, batteries, nuclear fuel reprocessing, biochemical processes in the human body, and the like. Routinely, researchers in these areas are confined to adopt the use of commercially-available noble metal planar disc electrodes as a means to observe electrochemical behavior at a planar geometry. In other cases, these researchers are forced to make use of cylindrical or spherical electrochemical substrate surfaces that may be non-ideal for rapid experimentation or post-processing procedures, such as scanning electron microscopy (SEM) and the like. Thus, what is needed in the art is an assembly and method that may be adapted to accommodate any flat substrate material for study, providing a defined surface area and diffusion behavior. Preferably, after use, the substrate may be readily ejected from the assembly and replaced with a new substrate. In this manner, the researcher may gain greater control over experimental parameters and the rapid implementation of parametric studies may be enabled.

Thus, what is needed in the art is an assembly and method that may be adapted to accommodate any flat substrate material for study, providing a defined surface area and diffusion behavior. Preferably, after use, the substrate may be readily ejected from the assembly and replaced with a new substrate. In this manner, the researcher may gain greater control over experimental parameters and the rapid implementation of parametric studies may be enabled.

Various references describe the use of electrochemical cell holders that are suitable for performing x-ray diffraction measurements in the presence of oxidizing or reducing environments. However, these assemblies are generally not usable in elevated-temperature environments, except for one at about 200 degrees C. (see RU 2425181 C1). In one case, there is an ability to change the substrate, but the assembly uses low-temperature plastic seals (see U.S. Pat. No. 7,022, 290). These assemblies also do not allow for submerging the substrate in a temperature-controlled electrolyte bath (see RU 2654317 C1 and U.S. Pat. No. 5,141,617). In other cases, the cells utilize only a simple two-electrode configuration (see US 2014/0270080). This limits the potential number of electrochemical measurements that may be performed on the system of choice. A three-electrode configuration is thus much preferred, being better able to accommodate the control of a working electrode substrate surface and define chemical reactions of interest.

Thus, the present disclosure provides an improved assembly and method for the rapid examination of any substrate at a defined geometry and simple diffusion behavior.

SUMMARY

In various exemplary embodiments, the present disclosure provides a multi-component assembly that is designed to withstand harsh chemical environments and elevated temperatures. A substrate foil is pressed between two electrically-insulating pieces of polytetrafluoroethylene (PTFE) or a similar chemically-robust material. This material could also be an electrically-nonconductive ceramic fiber capable of withstanding high temperatures (up to or exceeding 2,300 degrees C.). The PTFE or ceramic fiber acts as a gasket to seal the substrate surface. This gasket could also be made of a chemically-resistant glass, such as a fluorphlogopite mica in a borosilicate glass matrix. Such matrices may consist of silica, magnesia, alumina, potassium oxide, boron oxide, and/or fluorine sources. The gasket is retained within a housing that may be constructed of stainless steel, a high-nickel alloy, aluminum, or any other corrosion-resistant and inert material. From the top of the assembly, an electrically-insulated stainless steel rod or the like is threaded in to apply pressure and electrically connect the substrate with a power lead to any suitable piece of equipment, such as a potentiostat or a power supply. This connection may also be made by applying an electrically-conductive gel or paste. Once the assembly is complete, it may be submerged in an electrolyte bath and power in any configuration may be applied to make the desired measurements.

Other applications of the assembly include interchanging the substrate to determine optimal current density for electroplating and coating. For such applications, ideally the anode metal source material may be positioned in close proximity to the assembly opening under the substrate foil.

Optionally, the assembly completely encloses the electrolyte with the substrate and includes heating and/or cooling elements embedded in the housing to allow for defined temperature control in the absence of a large electrolyte bath. In addition, threaded connections may be attached to the top of the assembly to pass non-ionizing and/or ionizing radiation to the substrate for interfacial behavioral study.

The substrate shape may be changed from that of a flat foil or coupon to something similar to a rod, wire, or cubic extension that projects into the electrolyte to study other kinds of diffusion behavior and current density, for example.

Thus, the assembly of the present disclosure allows for the rapid exchange of substrates for expedited scientific development. The assembly may be used in high-temperature systems (200-600 degrees C.). The assembly is easy to assemble/disassemble and utilizes limited hardware. The assembly is configurable with 2-electrode and/or 3-electrode systems. The temperature compatibility of the assembly allows it to be heated for temperature-controlled operations. Finally, the assembly may accommodate various electrode geometries.

In one exemplary embodiment, the present disclosure provides an electrochemical substrate holder assembly, including: a first housing; a second housing coupled to the first housing; wherein the first housing and the second housing collectively define an interior space; a first gasket coupled to the first housing and adapted to contact a first side of a substrate; and a second gasket coupled to the second housing and adapted to contact a second side of the substrate; wherein the first gasket and the second gasket are collectively adapted to hold the substrate within the interior space collectively defined by the first housing and the second housing. The first housing and second housing are each manufactured from one or more of stainless steel, a nickel alloy, and aluminum. The first gasket and the second gasket are each manufactured from one or more of polytetrafluoroethylene, a ceramic fiber, a fluorphlogopite mica in a borosilicate glass matrix, silica, magnesia, alumina, potassium oxide, boron oxide, and fluorine. The first housing defines a first port adapted to receive a first electrical lead there through to electrically contact the first side of the substrate. The first electrical lead is disposed within an insulating sheath and is coupled to the first housing via a compression fitting. The second housing defines a second port adapted to allow a fluid to pass there through to fluidly contact at least the second side of the substrate. Optionally, the first gasket and the second gasket each include an annular structure. The second housing is adapted to receive one or more of a second electrical lead and a third electrical lead. The substrate includes one of a planar foil, a planar disc, a concave foil, a concave disc, a convex foil, a convex disc, a rod, a wire, and a cubic extension. The substrate includes one or more of an alkali metal, an alkaline earth, a non-metal, a metalloid, a ferrous metal, a lanthanide, an actinide, an alloy, a refractory metal, a conductive polymer, and a biological/organic moiety-functionalized substrate.

In another exemplary embodiment, the present disclosure provides a method of performing an electrochemical test on a substrate, including: providing a first housing; providing a second housing coupled to the first housing; wherein the first housing and the second housing collectively define an interior space; providing a first gasket coupled to the first housing and adapted to contact a first side of a substrate; providing a second gasket coupled to the second housing and adapted to contact a second side of the substrate; wherein the first gasket and the second gasket are collectively adapted to hold the substrate within the interior space collectively defined by the first housing and the second housing; and disposing the substrate between the first gasket and the second gasket within the interior space collectively defined by the first housing and the second housing. The method also includes introducing a fluid into at least a portion of the interior space collectively defined by the first housing and the second housing. The method further includes applying an electrical voltage/current to the substrate. The first housing and second housing are each manufactured from one or more of stainless steel, a nickel alloy, and aluminum. The first gasket and the second gasket are each manufactured from one or more of polytetrafluoroethylene, a ceramic fiber, a fluorphlogopite mica in a borosilicate glass matrix, silica, magnesia, alumina, potassium oxide, boron oxide, and fluorine. The first housing defines a first port adapted to receive a first electrical lead there through to electrically contact the first side of the substrate. The first electrical lead is disposed within an insulating sheath and is coupled to the first housing via a compression fitting. The second housing defines a second port adapted to allow the fluid to pass there through to fluidly contact at least the second side of the substrate. Optionally, the first gasket and the second gasket each include an annular structure. The second housing is adapted to receive one or more of a second electrical lead and a third electrical lead. The substrate includes one of a planar foil, a planar disc, a concave foil, a concave disc, a convex foil, a convex disc, a rod, a wire, and a cubic extension. The substrate includes one or more of an alkali metal, an alkaline earth, a non-metal, a metalloid, a ferrous metal, a lanthanide, an actinide, an alloy, a refractory metal, a conductive polymer, and a biological/organic moiety-functionalized substrate.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Again, in various exemplary embodiments, the present disclosure provides a multi-component assembly that is designed to withstand harsh chemical environments and elevated temperatures. A substrate foil is pressed between two electrically-insulating pieces of PTFE or a similar chemically-robust material. This material could also be an electrically-nonconductive ceramic fiber capable of withstanding high temperatures (up to or exceeding 2,300 degrees C.). The PTFE or ceramic fiber acts as a gasket to seal the substrate surface. This gasket could also be made of a chemically-resistant glass, such as a fluorphlogopite mica in a borosilicate glass matrix. Such matrices may consist of silica, magnesia, alumina, potassium oxide, boron oxide, and/or fluorine sources. The gasket is retained within a housing that may be constructed of stainless steel, a high-nickel alloy, aluminum, or any other corrosion-resistant and inert material. From the top of the assembly, an electrically-insulated stainless steel rod or the like is threaded in to apply pressure and electrically connect the substrate with a power lead to any suitable piece of equipment, such as a potentiostat or a power supply. This connection may also be made by applying an electrically-conductive gel or paste. Once the assembly is complete, it may be submerged in an electrolyte bath and power in any configuration may be applied to make the desired measurements.

Other applications of the assembly include interchanging the substrate to determine optimal current density for electroplating and coating. For such applications, ideally the anode metal source material may be positioned in close proximity to the assembly opening under the substrate foil.

Optionally, the assembly completely encloses the electrolyte with the substrate and includes heating and/or cooling elements imbedded in the housing to allow for defined temperature control in the absence of a large electrolyte bath. In addition, threaded connections may be attached to the top of the assembly to pass non-ionizing and/or ionizing radiation to the substrate for interfacial behavioral study.

The substrate shape may be changed from that of a flat foil or coupon to something similar to a rod, wire, or cubic extension that projects into the electrolyte to study other kinds of diffusion behavior and current density, for example.

Thus, again, the assembly of the present disclosure allows for the rapid exchange of substrates for expedited scientific development. The assembly may be used in high-temperature systems (200-600 degrees C.). The assembly is easy to assemble/disassemble and utilizes limited hardware. The assembly is configurable with 2-electrode and/or 3-electrode systems. The temperature compatibility of the assembly allows it to be heated for temperature-controlled operations. Finally, the assembly may accommodate various electrode geometries.

Figure 1:
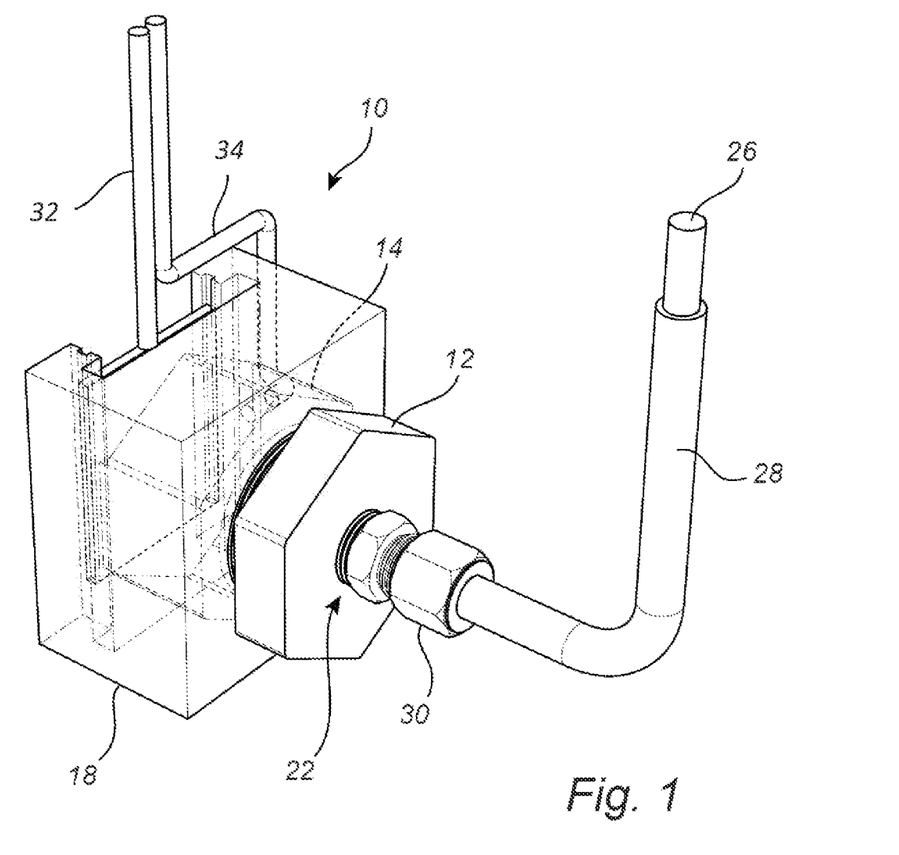
FIG. 1 is a partially-transparent perspective view of one exemplary embodiment of the electrochemical substrate holder assembly of the present disclosure.

Referring now specifically to FIG. 1, in one exemplary embodiment, the electrochemical substrate holder assembly 10 includes a first housing 12 coupled to a second housing 14. In the exemplary embodiment illustrated, a portion of the first housing 12 is externally threaded, while a portion of the second housing 14 is internally threaded, such that the first housing 12 threadingly engages the second housing 14. Preferably, the first housing 12 and the second housing 14 are each manufactured from a metallic material, such as stainless steel or aluminum, while the second housing 14 may include a thermally-insulating liner (not shown) or be disposed in a thermally insulating block 18. Collectively, the first housing 12 and the second housing 14 define an internal chamber in which the substrate 20 (FIG. 2) is held during an experimental test.

The first housing 12 defines a first port 22 through which appropriate electrical connections are made to the substrate 20, while the second housing 14 defines a second port 24 (FIG. 2) through which an electrolyte bath or the like is exposed to the substrate 20.

In a complex electrode system, a steel or copper working electrode 26 disposed in a fluoropolymer, alumina, or high-temperature ceramic sheath 28 is electrically coupled to the substrate 20 through the first port 22 and secured to the first housing 12 via an insulated compression fitting 30 or the like. In a simple electrode system, the working electrode 26 may be replaced with a simple anode or cathode. In the exemplary embodiment illustrated, a portion of the insulated compression fitting 30 is externally threaded, while the first port 22 is internally threaded, such that the insulated compression fitting 30 threadingly engages the first housing 12. The electrode sheath 28 may have any suitable shape and incorporate any suitable bends for a given application, such as the 90-degree bend illustrated. In the complex electrode system, a counter electrode 32 and a reference electrode 34 are both electrically coupled to the second housing 14 and, ultimately, the substrate 20. In the simple electrode system, the counter electrode 32 and reference electrode 34 may be replaced with a simple anode or cathode.

It should be noted that first housing 12 and the second housing 14 are manufactured from a conductive material such that electrical contact is made between the various electrodes 26, 32, and 34 and the substrate 20, while other components of the assembly may be manufactured from a non-conductive, thermally-insulating material, such as silica, magnesia, alumina, etc. In this manner, the first housing 12 and the second housing 14, with the enclosed substrate 20, can be submerged in an electrolyte bath at elevated temperature, for example, with the substrate 20 being exposed to the electrolyte bath through the second port 24. Optionally, the second housing 14 includes an embedded heating and/or cooling element (not illustrated) operable for heating and/or cooling the electrolyte bath and substrate 20. In this regard, the electrolyte bath may also complete certain electrical circuits. In the exemplary embodiment illustrated, portions of the exterior surfaces of the first housing 12, the second housing 14, and the compression fitting 30 are keyed for engagement with a wrench via which the various components are assembled/disassembled.

In the exemplary embodiment illustrated, the substrate 20 takes the form of a thin, planar foil or disc that is retained between a portion of the first housing 12 and the second housing 14. Optionally, the substrate 20 may be concave/convex as well, or may consist of a rod, wire, or cubic extension. In fact, any suitable shape can be utilized provided that the substrate 20 is retained between a portion of the first housing 12 and the second housing 14. The substrate material is also not limited, although exemplary substrate materials include an alkali metal, an alkaline earth, a non-metal, a metalloid, a ferrous metal, a lanthanide, an actinide, an alloy, a refractory metal, a conductive polymer, and a biological/organic moiety-functionalized substrate. Further, the substrate 20 may include a multi-component substrate or multiple substrates disposed in an adjacent configuration. In these cases, one or more separators may also be utilized to separate the components of the substrate or the substrates themselves. The components of the substrate or the multiple substrates may be held by the same clamping mechanism or by individual clamping mechanisms, as desired.

In the exemplary embodiment illustrated, the substrate 20 is retained within the first housing 12 and the second housing 14 via a clamping mechanism provided by a first annular gasket 42 (FIG. 2) disposed on a first side of the substrate 20 and retained within the first housing 12 and a second annular gasket 44 (FIG. 2) disposed on a second side of the substrate 20 and retained within the second housing 14. These annular gaskets 42 and 44 are each manufactured from PTFE, ceramic fiber, or the like, serve to electrically insulate the substrate 20 from the first housing 12 and the second housing 14, and are high-temperature tolerant. It will be readily apparent to those of ordinary skill in the art that other suitable clamping mechanisms may also be used, provided that the substrate 20 is adequately retained and exposed to the electrolyte bath, given temperature environment, and applied electrical current, which being electrically isolated from other components of the assembly 10.

Figure 2:
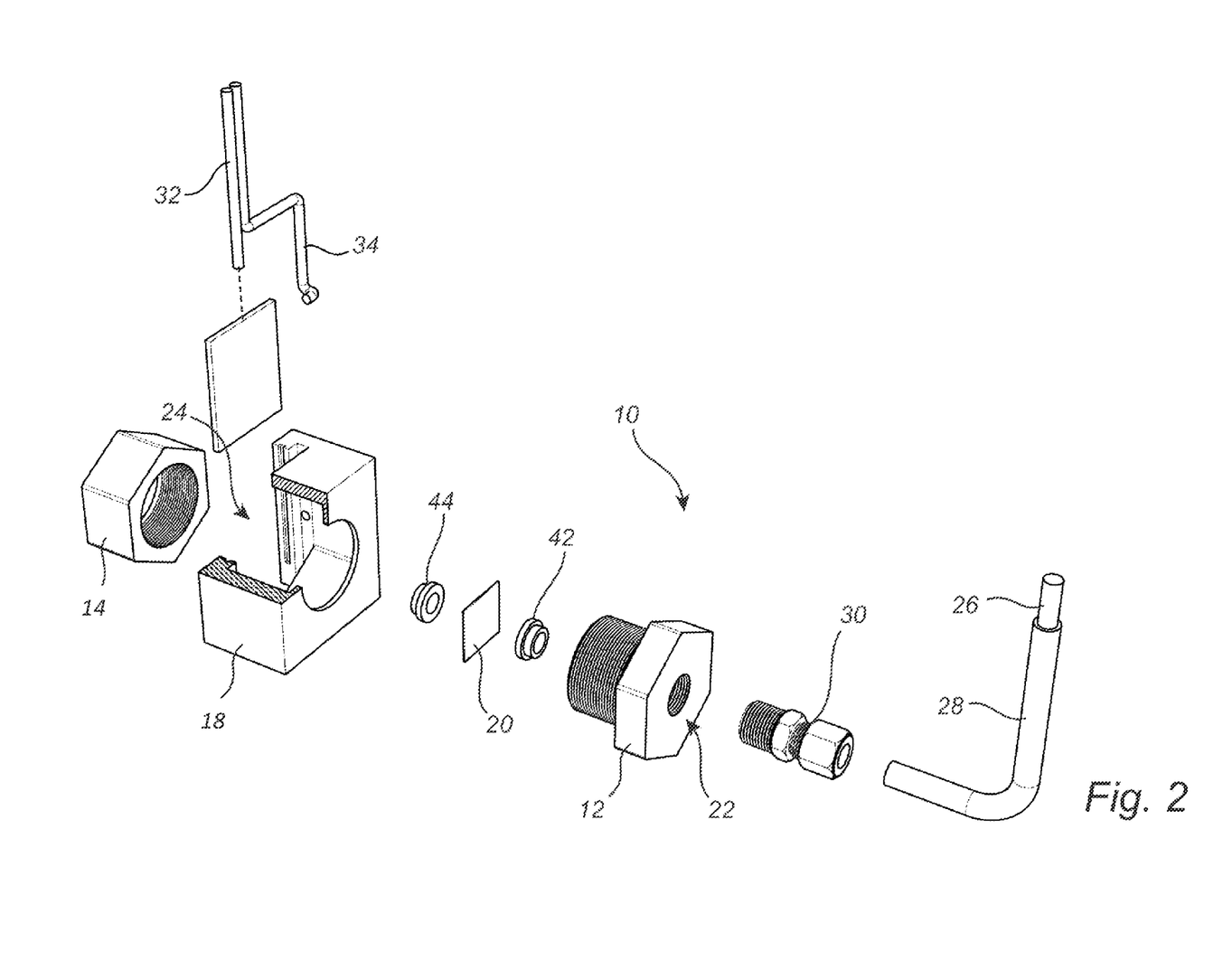
FIG. 2 is an exploded planar view of one exemplary embodiment of the electrochemical substrate holder assembly of the present disclosure.

In terms of process, after a preferred substrate 20 is chosen, it is secured between the first housing 12 and the first gasket 42 and the second housing 14 and the second gasket 44. The working electrode 26 or other lead is then compressed against the substrate 20, optionally after the application of a conductive gel between the two. The other electrode(s)/lead(s) 32 and/or 34 are coupled to the second housing 14 as normal. The assembly 10 is then submerged in the electrolyte bath or other solution and testing is run in the presence of a voltage/current. Following testing, the assembly 10 may be disassembled, and the substrate 20 removed and inspected for surface corrosion, pitting, crystal growth, etc.

The assembly 10 of the present disclosure is advantageous as its components are heat tolerant, no machining of the substrate 20 is necessary, and the substrate 20 has a defined uniform polarity. One exemplary application enabled is the exploration of charge polarization on the sharp edges of wires and the like.

Figure 3:
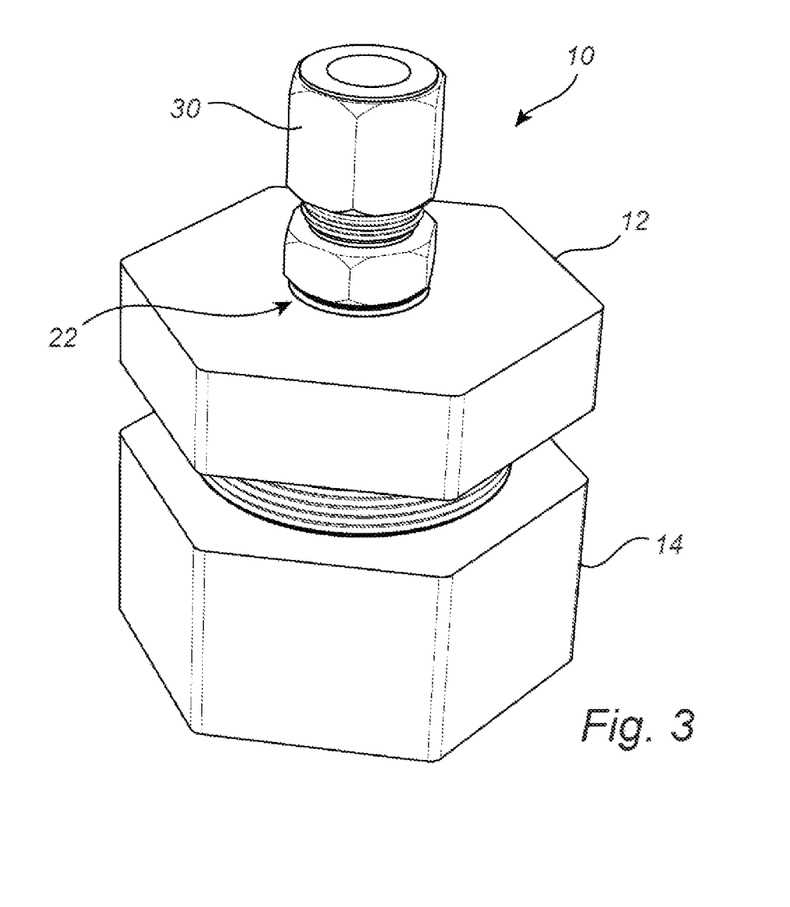
FIG. 3 is another perspective view of one exemplary embodiment of the electrochemical substrate holder assembly of the present disclosure.

FIG. 3 illustrates the threaded engagement of the first housing 12 with the second housing 14, as well as the threaded engagement of the compression fitting 30 with the first port 22 of the first housing 12. It will be readily apparent to those of ordinary skill in the art that other coupling mechanisms may also be used equally. The wrench-keyed shape of the first housing 12, the second housing 14, and the compression fitting 30 is also illustrated.

Figure 4:
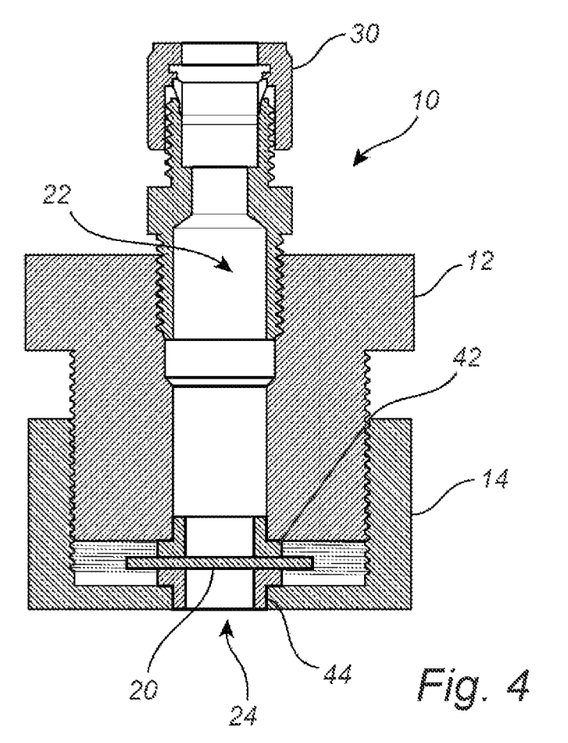
FIG. 4 is a cross-sectional view of one exemplary embodiment of the electrochemical substrate holder assembly of the present disclosure.

Referring now specifically to FIG. 4, in one exemplary embodiment, the electrochemical substrate holder assembly 10 again includes the first housing 12 coupled to the second housing 14. In the exemplary embodiment illustrated, a portion of the first housing 12 is externally threaded, while a portion of the second housing 14 is internally threaded, such that the first housing 12 threadingly engages the second housing 14. Preferably, the first housing 12 and the second housing 14 are each manufactured from a metallic material, such as stainless steel or aluminum, while the second housing 14 may include a thermally-insulating liner (not shown) or be disposed in a thermally insulating block 18 (FIG. 1). Collectively, the first housing 12 and the second housing 14 define the internal chamber in which the substrate 20 is held during an experimental test.

The first housing 12 defines the first port 22 through which appropriate electrical connections are made to the substrate 20, while the second housing 14 defines the second port 24 (FIG. 2) through which an electrolyte bath or the like is exposed to the substrate 20.

Again, in a complex electrode system, a steel or copper working electrode 26 (FIGS. 1 and 2) disposed in a fluoropolymer, alumina, or high-temperature ceramic sheath 28 (FIGS. 1 and 2) is electrically coupled to the substrate 20 through the first port 22 and secured to the first housing 12 via the insulated compression fitting 30 or the like. In a simple electrode system, the working electrode 26 may be replaced with a simple anode or cathode. In the exemplary embodiment illustrated, a portion of the insulated compression fitting 30 is externally threaded, while the first port 22 is internally threaded, such that the insulated compression fitting 30 threadingly engages the first housing 12. The electrode sheath 28 may have any suitable shape and incorporate any suitable bends for a given application. In the complex electrode system, a counter electrode 32 (FIGS. 1 and 2) and a reference electrode 34 (FIGS. 1 and 2) are both electrically coupled to the second housing 14 and, ultimately, the substrate 20. In the simple electrode system, the counter electrode 32 and reference electrode 34 may be replaced with a simple anode or cathode.

It should again be noted that first housing 12 and the second housing 14 are manufactured from a conductive material such that electrical contact is made between the various electrodes 26, 32, and 34 and the substrate 20, while other components of the assembly may be manufactured from a non-conductive, thermally-insulating material, such as silica, magnesia, alumina, etc. In this manner, the first housing 12 and the second housing 14, with the enclosed substrate 20, can be submerged in an electrolyte bath at elevated temperature, for example, with the substrate 20 being exposed to the electrolyte bath through the second port 24. Optionally, the second housing 14 includes an embedded heating and/or cooling element (not illustrated) operable for heating and/or cooling the electrolyte bath and substrate 20. In this regard, the electrolyte bath may also complete certain electrical circuits. In the exemplary embodiment illustrated, portions of the exterior surfaces of the first housing 12, the second housing 14, and the compression fitting 30 are keyed for engagement with a wrench via which the various components are assembled/disassembled.

In the exemplary embodiment illustrated, the substrate 20 again takes the form of a thin, planar foil or disc that is retained between a portion of the first housing 12 and the second housing 14. Optionally, the substrate 20 may be concave/convex as well, or may consist of a rod, wire, or cubic extension. In fact, any suitable shape can be utilized provided that the substrate 20 is retained between a portion of the first housing 12 and the second housing 14. The substrate material is also not limited, although exemplary substrate materials include an alkali metal, an alkaline earth, a non-metal, a metalloid, a ferrous metal, a lanthanide, an actinide, an alloy, a refractory metal, a conductive polymer, and a biological/organic moiety-functionalized substrate.

In the exemplary embodiment illustrated, the substrate 20 is retained within the first housing 12 and the second housing 14 via a clamping mechanism provided by the first annular gasket 42 disposed on a first side of the substrate 20 and retained within the first housing 12 and the second annular gasket 44 disposed on a second side of the substrate 20 and retained within the second housing 14. These annular gaskets 42 and 44 are each manufactured from PTFE, ceramic fiber, or the like, serve to electrically insulate the substrate 20 from the first housing 12 and the second housing 14, and are high-temperature tolerant. It will be readily apparent to those of ordinary skill in the art that other suitable clamping mechanisms may also be used, provided that the substrate 20 is adequately retained and exposed to the electrolyte bath, the given temperature environment, and the applied electrical current, while being electrically isolated from other components of the assembly 10.

In terms of process, after a preferred substrate 20 is chosen, it is again secured between the first housing 12 and the first gasket 42 and the second housing 14 and the second gasket 44. The working electrode 26 or other lead is then compressed against the substrate 20, optionally after the application of a conductive gel between the two. The other electrode(s)/lead(s) 32 and/or 34 are coupled to the second housing 14 as normal. The assembly 10 is then submerged in the electrolyte bath or other solution and testing is run in the presence of a voltage/current. Following testing, the assembly 10 may be disassembled, and the substrate 20 removed and inspected for surface corrosion, pitting, crustal growth, etc.

Again, the assembly 10 of the present disclosure is advantageous as its components are heat tolerant, no machining of the substrate 20 is necessary, and the substrate 20 has a defined uniform polarity. One exemplary application enabled is the exploration of charge polarization on the sharp edges of wires and the like.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An electrochemical substrate holder and substrate assembly, comprising:
a first housing;
a second housing coupled to the first housing and disposed in a thermally insulating block;
wherein the first housing and the second housing are made of a metallic, conductive material and collectively define an interior space in which a substrate is held;
wherein an externally threaded portion of the first housing is threaded into an internally threaded portion of the second housing, and an external portion of the first housing and the second housing each are hexagonal in shape and adapted for engagement with a wrench;
the substrate having a first side and a second side, the substrate being a solid foil or a solid disc and configured for electrochemical testing thereof of at least one of surface corrosion, pitting and crystal growth;

a first gasket coupled to the first housing and adapted to contact and seal the first side of the substrate, wherein the first gasket comprises an electrically insulating material; and a second gasket coupled to the second housing and adapted to contact and seal the second side of the substrate, wherein the second gasket comprises an electrically insulating material;

wherein the first gasket and the second gasket are each made of a material stable at a temperature of 600 degrees C. and are collectively adapted to hold the substrate within the interior space collectively defined by the first housing and the second housing, and electrically insulate the substrate from the first housing and the second housing, and wherein the substrate is configured to be submerged in and electrochemically tested in an electrolyte bath;

wherein the first housing defines a first port adapted to receive a first electrical lead there through to electrically contact the first side of the substrate through the first gasket, wherein the first electrical lead is disposed within an insulating ceramic sheath and is coupled to the first housing via an insulated compression fitting and configured to be compressed against the substrate; and wherein the second housing defines a second port adapted to allow a fluid to pass there through to fluidly contact the second side of the substrate through the second gasket, and the second housing is adapted to receive a second electrical lead and a third electrical lead, and the assembly is adapted to make electrical contact between the first electrical lead, the second electrical lead, the third electrical lead and the substrate; and the second housing includes a heating element configured to heat the substrate and the bath, thereby forming the electrochemical substrate holder and substrate assembly;

and wherein the first housing and the second housing, with the enclosed substrate therein are adapted to be submerged in the electrolyte bath with the substrate adapted to be exposed to the electrolyte bath through the second port; and wherein the assembly is adapted for use in a high temperature system of 200 to 600 degrees C.

2. The electrochemical substrate holder and substrate assembly of claim 1, wherein the first housing and second housing are each manufactured from one or more of stainless steel, a nickel alloy, and aluminum.

3. The electrochemical substrate holder and substrate assembly of claim 1, wherein the first gasket and the second gasket are each manufactured from one or more of polytetrafluoroethylene, a ceramic fiber, a fluorphlogopite mica in a borosilicate glass matrix, silica, magnesia, alumina, potassium oxide, boron oxide, and fluorine.

4. The electrochemical substrate holder and substrate assembly of claim 1, wherein the first gasket and the second gasket each comprise an annular structure.

5. The electrochemical substrate holder and substrate assembly of claim 1, wherein the substrate comprises one of a planar foil, a planar disc, a concave foil, a concave disc, a convex foil, and a convex disc.

6. The electrochemical substrate holder and substrate assembly of claim 1, wherein the substrate comprises one or more of an alkali metal, an alkaline earth, a non-metal, a metalloid, a ferrous metal, a lanthanide, an actinide, an alloy, a refractory metal, a conductive polymer, and a biological/organic moiety-functionalized substrate.

7. A method of performing an electrochemical test on a substrate, comprising:
providing a first housing;
providing a second housing;
coupling the second housing to the first housing by threading an externally threaded portion of the first housing into an internally threaded portion of the second housing, wherein an external portion of the first housing and the second housing each are hexagonal in shape and adapted for engagement with a wrench, and the second housing is disposed in a thermally insulating block;

wherein the first housing and the second housing are made of a metallic, conductive material and collectively define an interior space in which a substrate is held;

providing the substrate, the substrate having a first side and a second side, the substrate being a solid foil or a solid disc and, configured for electrochemical testing thereof of at least one of surface corrosion, pitting and crystal growth;

providing a first gasket coupled to the first housing and adapted to contact and seal the first side of the substrate, wherein the first gasket comprises an electrically insulating material;

providing a second gasket coupled to the second housing and adapted to contact and seal the second side of the substrate, wherein the second gasket comprises an electrically insulating material;

wherein the first gasket and the second gasket are each made of a material stable at a temperature of 600 degrees C. and are collectively adapted to hold the substrate within the interior space collectively defined by the first housing and the second housing, and electrically insulate the substrate from the first housing and the second housing;

forming an assembly by disposing the substrate between the first gasket and the second gasket within the interior space collectively defined by the first housing and the second housing, wherein the substrate is submerged in and electrochemically tested in an electrolyte bath for at least one of surface corrosion, pitting and crystal growth;

wherein the first housing defines a first port adapted to receive a first electrical lead there through to electrically contact the first side of the substrate through the first gasket, wherein the first electrical lead is disposed within an insulating ceramic sheath and is coupled to the first housing via an insulated compression fitting and compressed against the substrate; and wherein the second housing defines a second port adapted to allow a fluid to pass there through to fluidly contact the second side of the substrate through the second gasket, and the second housing receives a second electrical lead and a third electrical lead, and the assembly is adapted to make electrical contact between the first electrical lead, the second electrical lead, the third electrical lead and the substrate: and the second housing includes a heating element configured to heat the substrate and the bath;

wherein the first housing and the second housing, with the enclosed substrate therein are submerged in the electrolyte bath with the substrate exposed to the electrolyte bath through the second port; and wherein the assembly is adapted for use in a high temperature system of 200 to 600 degrees C.

8. The method of claim 7, further comprising introducing the fluid into a portion of the interior space collectively defined by the first housing and the second housing on the second side of the substrate.

9. The method of claim 7, further comprising applying an electrical voltage/current to the substrate.

10. The method of claim 7, wherein the first housing and second housing are each manufactured from one or more of stainless steel, a nickel alloy, and aluminum.

11. The method of claim 7, wherein the first gasket and the second gasket are each manufactured from one or more of polytetrafluoroethylene, a ceramic fiber, a fluorphlogopite mica in a borosilicate glass matrix, silica, magnesia, alumina, potassium oxide, boron oxide, and fluorine.

12. The method of claim 7, wherein the first gasket and the second gasket each comprise an annular structure.

13. The method of claim 7, wherein the substrate comprises one of a planar foil, a planar disc, a concave foil, a concave disc, a convex foil, and a convex disc.

14. The method of claim 7, wherein the substrate comprises one or more of an alkali metal, an alkaline earth, a non-metal, a metalloid, a ferrous metal, a lanthanide, an actinide, an alloy, a refractory metal, a conductive polymer, and a biological/organic moiety-functionalized substrate.

* * * * *